US012754791B2

(12) United States Patent
Tsvetov et al.

(10) Patent No.: US 12,754,791 B2
(45) Date of Patent: Oct. 6, 2026

(54) PREDICTIVE REPORTING SYSTEM FOR DIGITAL INKING

(71) Applicant: Microsoft Technology Licensing, LLC, Redmond, WA (US)

(72) Inventors: Anatoly Tsvetov, Kfar-Yona (IL); Roei Shlomo Menashof, Netanya (IL); Oren Istrin, Tel-Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/952,566

(22) Filed: Nov. 19, 2024

(65) Prior Publication Data

US 2026/0140807 A1 May 21, 2026

(51) Int. Cl.
*G06F 3/041* (2006.01)
*G06F 3/04883* (2022.01)
*G06F 11/07* (2006.01)

(52) U.S. Cl.
CPC ........ *G06F 11/0766* (2013.01); *G06F 3/0418* (2013.01); *G06F 3/04883* (2013.01); *G06F 11/0754* (2013.01)

(58) Field of Classification Search
CPC ........................................................ G06F 3/04
See application file for complete search history.

(56) References Cited

U.S. PATENT DOCUMENTS 5,861,874 A * 1/1999 Joto ...................... G06F 3/0418 345/173
5,995,081 A * 11/1999 Kato ..................... G06T 11/203 345/174
9,189,147 B2 * 11/2015 Asmi .................. G06F 3/04883
10,976,867 B1 * 4/2021 Pollmann .............. G06F 3/0416
11,620,019 B1 * 4/2023 Luo ....................... G06F 3/0418 345/174
11,675,441 B1 * 6/2023 Yao ......................... G06F 3/038 345/179
12,056,310 B2 * 8/2024 Kwon ................. G06F 3/04166
12,353,651 B2 * 7/2025 Wu ..................... G06F 3/03545
2011/0310118 A1 * 12/2011 Asmi .................. G06F 3/04883 345/619
2014/0118295 A1 * 5/2014 Motoi ................. G06F 3/04883 345/174
2014/0204126 A1 * 7/2014 Mankowski ........ G06F 3/03545 345/646
2015/0091832 A1 * 4/2015 Mizunuma .......... G06F 3/03545 345/173
2015/0242047 A1 * 8/2015 Zafiris ................... G06F 3/0485 345/173

(Continued)

*Primary Examiner* — Sephr Azari
(74) *Attorney, Agent, or Firm* — Weaver IP L.L.C.

(57) ABSTRACT

Predictive reporting of digital inking data is disclosed herein. An inking input predictor is employed on both a digitizer and a host computer. Reports are sent when the error between a predicted and an actual report exceeds a threshold. The predictive reporting of inking data reduces the number of reports sent by the digitizer to the host computer. Predictions may be made by prediction models, such as polynomial regression, Fourier series, and/or user-defined models. Models may be selected based on one or more conditions, providing adaptability to different input data types and user requirements.

20 Claims, 7 Drawing Sheets

(56) References Cited

U.S. PATENT DOCUMENTS

| | | | | |
|---|---|---|---|---|
| 2016/0078649 | A1* | 3/2016 | Bonacina | G06F 3/03545<br>345/442 |
| 2017/0242579 | A1* | 8/2017 | Poon | G06N 5/022 |
| 2022/0121310 | A1* | 4/2022 | Yao | G06F 3/04883 |
| 2022/0413637 | A1* | 12/2022 | Wu | G06N 5/022 |
| 2023/0011852 | A1* | 1/2023 | Yao | G06F 3/0418 |
| 2023/0152960 | A1* | 5/2023 | Sydorenko | G06N 3/08<br>715/863 |
| 2023/0289014 | A1* | 9/2023 | Yoshitomi | G06F 3/04186 |
| 2024/0071118 | A1* | 2/2024 | Schreiber | G06F 40/274 |
| 2025/0370559 | A1* | 12/2025 | Liu | G06F 3/0488 |

* cited by examiner

PREDICTIVE REPORTING SYSTEM FOR DIGITAL INKING

BACKGROUND

A computing device may have multiple types of input devices, such as a keyboard, a mouse, a touch device (e.g., a touchscreen), etc. A touch instrument (e.g., a stylus or pen) may be used with a touch screen. A touch instrument enables a user to write or draw on a touch screen in the form of digital ink. The digital ink may be captured as digital data by a digitizer. The digital ink may be used in various applications (e.g., converted to text, drawings, etc.). Applications may provide digital ink feedback to users, for example, in the form of a displayed image and/or haptic feedback (e.g., vibrations). For example, digital ink entered at particular coordinates of a touchpad may be mapped to the display coordinates of an application window displayed by a computing device to present visual representations of digital inking to the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Predictive reporting for digital inking data representative of detected touch input operations is disclosed herein. An inking input predictor is employed with respect to the digitizer and with respect to the host computer that contains the digitizer. Reports are sent when the error (e.g., a determined difference) between a predicted and an actual report exceeds a threshold. Predictions are made by prediction models, such as polynomial regression, Fourier series, and/or user-defined models. Such models is selected based on one or more conditions, providing adaptability to different input data types and user requirements. Such predictive reporting of inking data enables a number of reports sent by the digitizer to the host computer to be reduced.

In an aspect, a digitizer is configured to generate inking data representative of detected input operations performed in a user input area displayed by a host computing device. A predictive reporter is present that includes a predictor, a detector, and a report generator. The predictor is configured to generate inking data representative of input operations predicted to be performed in the user input area based at least on inking data generated by the digitizer representative of previously detected input operations in the user input area. The detector is configured to determine an error between the inking data representative of a detected input operation and the inking data representative of a predicted input operation. The report generator is configured to provide a report associated with the detected input operation to the host computing device in response to the error exceeding a threshold.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
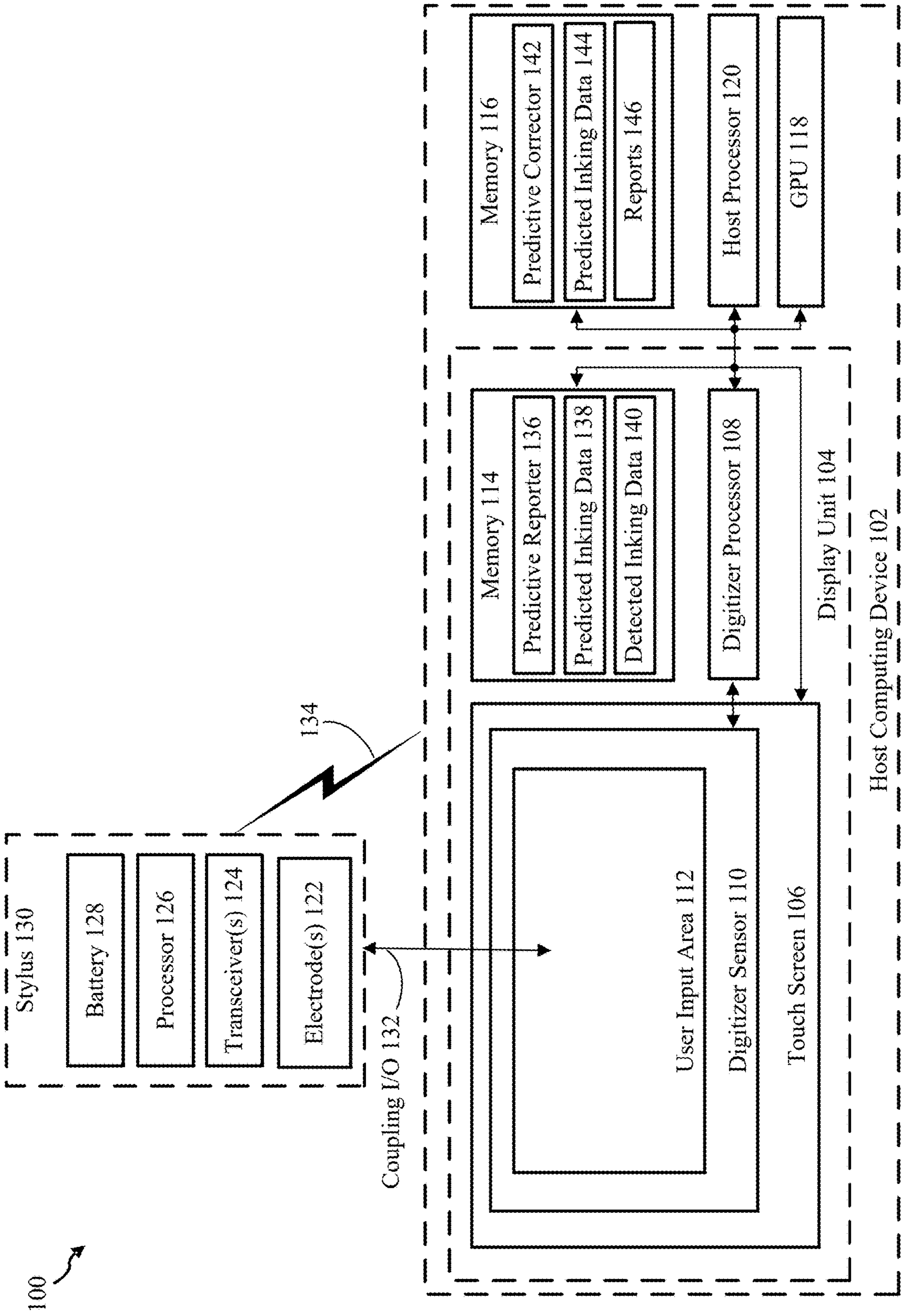
FIG. 1 shows a block diagram of an example system for predictive reporting of touch input, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

A computing device may have multiple types of input devices, such as a keyboard, a mouse, a touch device (e.g., a touchscreen), etc. A touch instrument (e.g., a stylus or pen)

may be used with a touch screen. A touch instrument enables a user to write or draw on a touch screen in the form of digital ink. The digital ink is captured as digital data by a digitizer. The digital ink is used in various applications (e.g., converted to text, drawings, etc.). Applications may provide digital ink feedback to users, for example, in the form of a displayed image and/or haptic feedback (e.g., vibrations). For example, digital ink entered at particular coordinates of a touchpad may be mapped to the display coordinates of an application window displayed by a computing device to present visual representations of digital inking to the user. Feedback indicated to a user is time-sensitive relative to user operations, for example, to avoid observable delay between user operations and feedback. A significant number of data transmissions, transmitted data processing operations, and associated power consumption may be necessary to generate digital ink feedback, which may cause performance issues, such as feedback latency.

High accuracy and low latency may be crucial for an optimal user experience with digital inking applications. A high volume of reports from the digitizer to the host computer may lead to increased data transmission, higher power consumption, and/or latency (e.g., due to constraints of a reporting rate allowed by the host operating system (OS)).

As such, methods, systems, and computer program products are provided for enabling enable predictive reporting for digital inking data representative of detected touch input operations. Predictive reporting of inking data reduces the number of reports sent by the digitizer to the host computer. A predictive reporting system for inking data minimizes data transmission, reduces latency, increases bandwidth (e.g., for critical information), reduces power consumption, and supports high performance (e.g., accuracy, responsiveness). An inking input predictor is employed on both the digitizer and the host computer. Reports are sent when the error between a predicted and an actual report exceeds a threshold. Predictions are made by prediction models, such as polynomial regression, Fourier series, and/or user-defined models. Models may be selected based on one or more conditions, providing adaptability to different input data types and user requirements.

Embodiments are configured in various ways. For instance, FIG. 1 shows a block diagram of an example system 100 for predictive reporting of touch input, in accordance with an example embodiment. As shown in FIG. 1, example system 100 includes a host computing device 102 and a stylus 130. Host computing device 102 is associated with an integrated or discrete digitizer device. In the example shown in FIG. 1, host computing device 102 includes a host processor 120, a graphics processing unit (GPU) 118, memory 116, and a display unit 104, which includes a touch screen 106, digitizer processor 108, and memory 114. Touch screen 106 includes a digitizer sensor 110 of a digitizer of touch screen 106. Memory 114 stores an executable predictive reporter 136 and operational data, such as predicted inking data 138 and detected inking data 140. Stylus 130 includes one or more electrodes 122, one or more transceivers 124, a processor 126, and a battery 128. These components of system 100 are described in further detail as follows. Memory 116 stores an executable predictive corrector 142 and operational data, such as predicted inking data 144 and reports 146. These components of example system 100 are described in further detail as follows.

Host computing device 102 is any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 102 may include one or more applications, operating systems, virtual machines (VMs), storage devices, etc., that are executed, hosted, and/or stored therein or via one or more other computing devices via network(s) (not shown). Host computing device 102 may execute one or more processes in one or more computing environments. A process is any type of executable (e.g., binary, program, application) that is being executed by host computing device 102. A process may include an automated pairing process, e.g., between host computing device 102 and stylus 130, or an application that receives touch input. A computing environment may be any computing environment (e.g., any combination of hardware, software, and firmware). An example computing device with example features is presented in FIG. 9.

Host computing device 102 includes display unit 104 for displaying imagery to a user, such as by displaying a user's touch input as feedback as the user is providing the touch input. Host computing device (e.g., touch device) 102 includes host processor 120 configured to execute software applications that cause content, such as touch input, to be displayed to users via display unit 104. Host computing device 102 may also be configured to display content generated by remotely executed software applications. Host computing device 102 may include GPU 118, which is configured to render video for display by display unit 104, for example, to free up host processor 120 to perform other processing.

Display unit 104 includes touch screen 106 as a display device and input device for user input (e.g., by touch and/or use of stylus 130). Touch screen 106 may include an integrated touch interface (e.g., touch screen or touch pad) or a peripheral touch interface. Touch screen 106 is utilized by users through interaction with touch instruments, such as stylus 130, e.g., to perform inking operations.

A digitizer is a device that converts analog input into digital signals. A digitizer, or a portion thereof, is built into a display device, thereby allowing a user to interact with displayed images. A digitizer may include a digitizer sensor and a digitizer processor.

Touch screen 106 includes a digitizer sensor 110, which is implemented as an antenna array (e.g., a two-dimensional array of antenna elements/electrodes) or in another array of sensors. Digitizer sensor 110 includes user input area 112. Digitizer sensor 110 may detect interactions and communications (e.g., commands and/or information) associated with user input operations, e.g., using stylus 130. For example, digitizer sensor 110 may be configured to receive/transmit communication signals from/to stylus 130. Antennas (e.g., electrodes) in digitizer sensor 110 may detect energy (e.g., coupling and transmission energy) associated with operations using stylus 130. Digitizer sensor 110 may detect energy in a variety of forms and sources, such as wirelessly transmitted signals 134 conveying information (e.g., haptic parameters), electrostatic coupling 132, etc. Digitizer sensor 110 may detect touch-related operations with contact (e.g., zero (0) hover height) or without contact (e.g., hover height >0). Digitizer sensor 108 may generate signals indicative of user input for processing by digitizer processor 108.

Display unit 104 includes digitizer processor 108. Digitizer processor 108 (e.g., a touch controller (TC)) may process (e.g., at least in part) signals generated by digitizer sensor 110, e.g., in response to user interaction with touch screen 106, such as in user input area 112. Digitizer processor 108 may receive and process signals indicative of interactions and communications (e.g., commands and/or information) associated with stylus 130, for example, to determine when and/or where to implement inking operations, erasing operations, provide feedback, etc. Digitizer processor 108 may determine interactions and communications by processing energy detected by digitizer sensor 110. Digitizer processor 108 may generate inking data representative of detected input operations.

Stylus 130 is an active or passive device. As shown by example in FIG. 1, stylus 130 is an active device. Examples of a stylus include, without limitation, a digital pen, a light pen, a wearable device for a user's finger, a glove, etc. Stylus 130 is held and wielded by a user to interface with host computing device 102 to perform functions, such as selecting objects, writing/inking, shading (e.g., low force inking), erasing, and/or the like.

Stylus 130 includes a battery 128, a processor 126, transceiver(s) 124, and electrode(s) 122. Battery 128 may power processor 126 and transceiver(s) 124, and/or charge electrode(s) 122. Processor 126 may execute one or more programs related to operations of stylus 130, such as communication (e.g., transmission and/or reception) of commands and/or information (e.g., inking parameters, haptic parameters) between stylus 130 and host computing device 102. Processor 126 may send/receive communications through transceiver(s) 124.

A user may use stylus 130 and/or one or more additional input devices (e.g., in addition to stylus 130 with touch screen 106), such as a keyboard, mouse, microphone, virtual reality headset, etc. to provide input to host computing device 102. A user may use stylus 130 to select a region, such as user input area 112, to provide input. A user may use stylus 130 to interact with touch screen 106, for example, while an image is displayed by display unit 104, which may include imagery representative of inputs made by stylus 130.

Host processor 120 executes one or more software applications that utilize inking data generated by digitizer processor 108, such as displaying imagery representative of inputs made using stylus 130. For example, software applications may respond to inking data indicative of user touch input (e.g., inking operations) by causing display unit 104 (e.g., touch screen 106) to display a representation of the touch input. User input in user input area 112 is displayed, for example, by mapping user input area 112 of digitizer sensor 110 to an area of a display (e.g., touch screen 106).

Digitizer processor 108 may utilize memory 114 to store executable programs (e.g., instructions), operational data, etc. Executable programs may include predictive reporter 136, e.g., among other executable programs. Operational data may include predicted inking data 138 and detected inking data 140. Inking data may include, for example, input coordinates (e.g., x,y position data). Memory 114 may include any type of computer-readable media such as, but are not limited to computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs).

Digitizer processor 108 may execute predictive reporter 136, which selectively/conditionally provides inking data reports to the host processor 120 (e.g., to an operating system (OS) and/or one or more applications that utilize inking data). In some examples, predictive reporter 136 is executed by another component, such as a neural processing unit (NPU), examples of which are described with respect to FIG. 9 further below. Predictive reporter 136 predicts user input, e.g., in user input area 112, yielding predicted inking data 138. Predictive reporter 136 may utilize a model to predict user input. Predictive reporter 136 (e.g., a predictive model) may determine current predicted inking data 138, for example, based on, at least in part, previously detected inking data 138. Predicting current inking data based on previously detected inking data has benefits, including reliability (due to user future action correlating to past action) and relatively low resource consumption (e.g., processor cycles and storage). Predictive reporter 136 determines an error between current predicted inking data 138 and current detected inking data 140 generated by digitizer processor 108. Predictive reporter 136 compares the error to a threshold, for example, to determine whether to send an inking data report to host processor 120. Predictive reporter 136 may send a report about current detected inking data to host processor 120, for example, in response to the error exceeding an allowable error threshold. Predictive reporter 136 may not send a report about current detected inking data, for example, if the error is at or below the acceptable error threshold. Sending the report when the error is below the acceptable error threshold has the advantage of sending reports that are relatively more relevant, while avoiding using communication bandwidth and host processing by not sending reports when the error is greater than the acceptable error threshold. The threshold may be (e.g., dynamically) adaptable, for example, based on one or more conditions, such as a power state, battery life, etc. (e.g., an allowable error threshold may increase in a low power state to conserve battery power). The predicted and detected inking data have the format of a report, e.g., avoiding conversion. In some examples, the report indicates the error. In some examples, the report indicates the detected inking data.

Host processor 120 may utilize memory 116 to store executable programs (e.g., instructions), operational data, etc. Executable programs may include predictive corrector 142, e.g., among other executable programs. Operational data may include predicted inking data 144 and reports 146. Inking data and reports may include, for example, input coordinates (e.g., x, y position data). Memory 116 may include any type of computer-readable media such as, but are not limited to computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs).

Host processor 120 may execute predictive corrector 142 and an operating system (OS) and/or one or more applications that utilize inking data. In some examples, predictive corrector 142 is executed by another component, such as an NPU. Predictive corrector 142, like predictive reporter 136, predicts user input, e.g., in user input area 112, yielding predicted inking data 144. Predictive corrector 142, like predictive reporter 136, may utilize a model to predict user input. Predictive corrector 142 (e.g., a predictive model) may determine current predicted inking data 138, for example, based on, at least in part, previously detected inking data 138 and/or predicted inking data 144 (e.g., when reports are not received). The predicted inking data is in the format of a report, which avoids conversion to actual text or drawing elements, and thus saves digitizer processing resources. Predictive corrector 142 receives the selectively/conditionally provided inking data reports provided by predictive reporter 136. In some examples, received reports may indicate errors. In some examples, received reports may indicate detected inking data. Predictive corrector 142 uses the reports to correct predicted input. Corrected predictions (e.g., consistent with detected input) are used to correct a display of user input and/or to correct a set of input data for predictive corrector 142 to predict next/subsequent user input in user input area 112. For example, predictive reporter 142 may use a reported error to adjust a predicted input or may use a reported detected input to replace a predicted input. The corrections to current predictions may improve the accuracy of displayed user input. The corrections to input data may improve the accuracy of subsequent predictions. The corrections may serve to synchronize model input used by predictive corrector 142 to model input used by predictive reporter 136.

Figure 2:
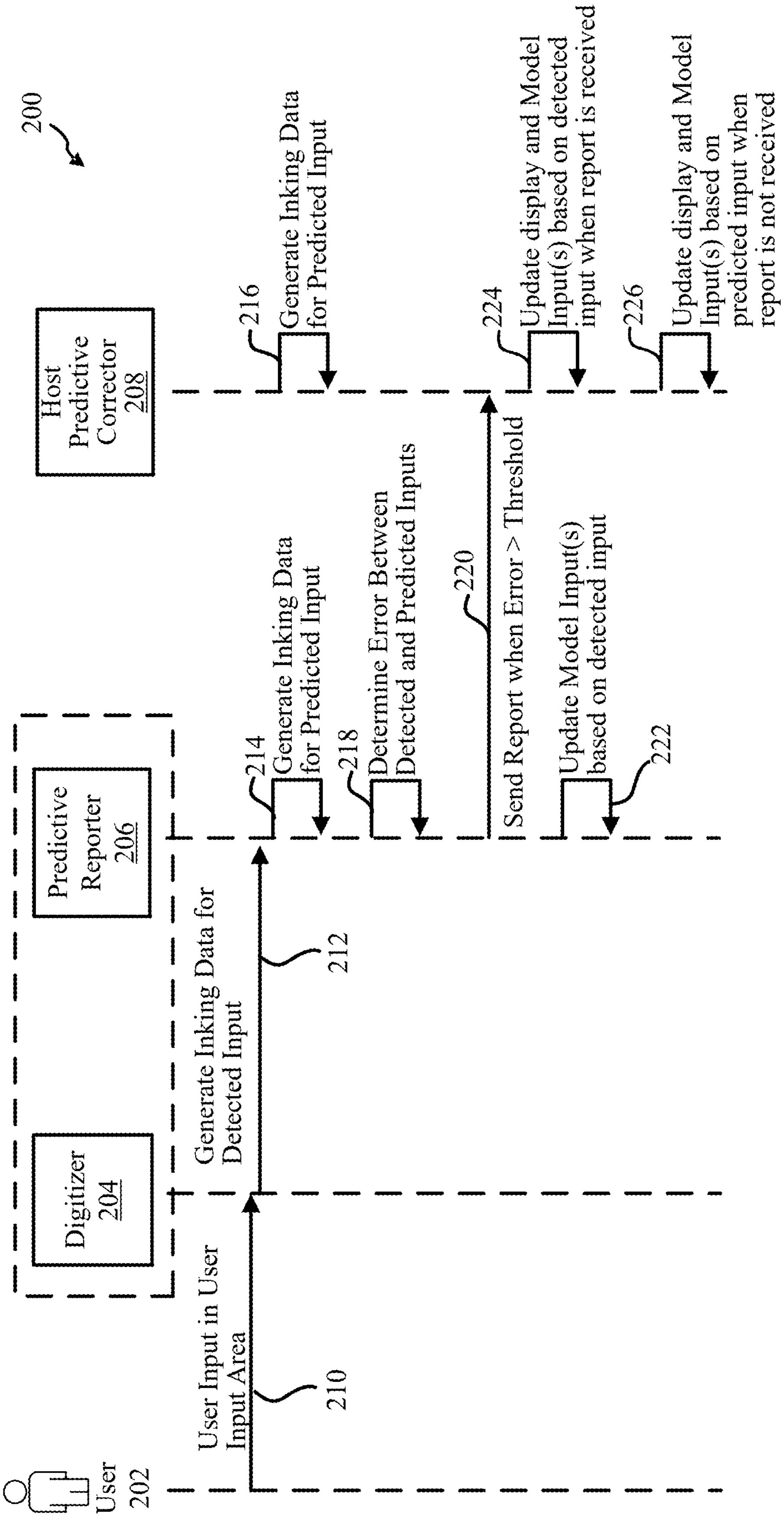
FIG. 2 shows a flow diagram of a process for providing predictive reports to a host predictive corrector, according to an embodiment.

System 100 of FIG. 1 may operate in various ways in embodiments. For instance, FIG. 2 shows a flow diagram 200 of a process for providing predictive reports to a host predictive corrector, according to an embodiment. An order of operations/steps is not implied by numbering or positioning. An order of a set of operations is indicated, for example, if an operation is dependent upon one or more operations that must necessarily precede the operation. FIG. 2 shows an example of operations and interactions of a user 202 with a digitizer 204, a predictive reporter 206, and a predictive corrector 208 of a touch computing device, such as host computing device 102 of FIG. 1. Predictive reporter 206 and predictive corrector 208 are examples of predictive reporter 136 and predictive corrector 142 of FIG. 1. The example shown in FIG. 2 represents a loop that occurs for each (e.g., incremental) input in user input area of digitizer 204. FIG. 2 is described with reference to the example of inking data generated and conditionally reported in response to user input shown in FIG. 3. The process shown in FIG. 2 repeats for each circle shown in FIG. 3.

Figure 3:
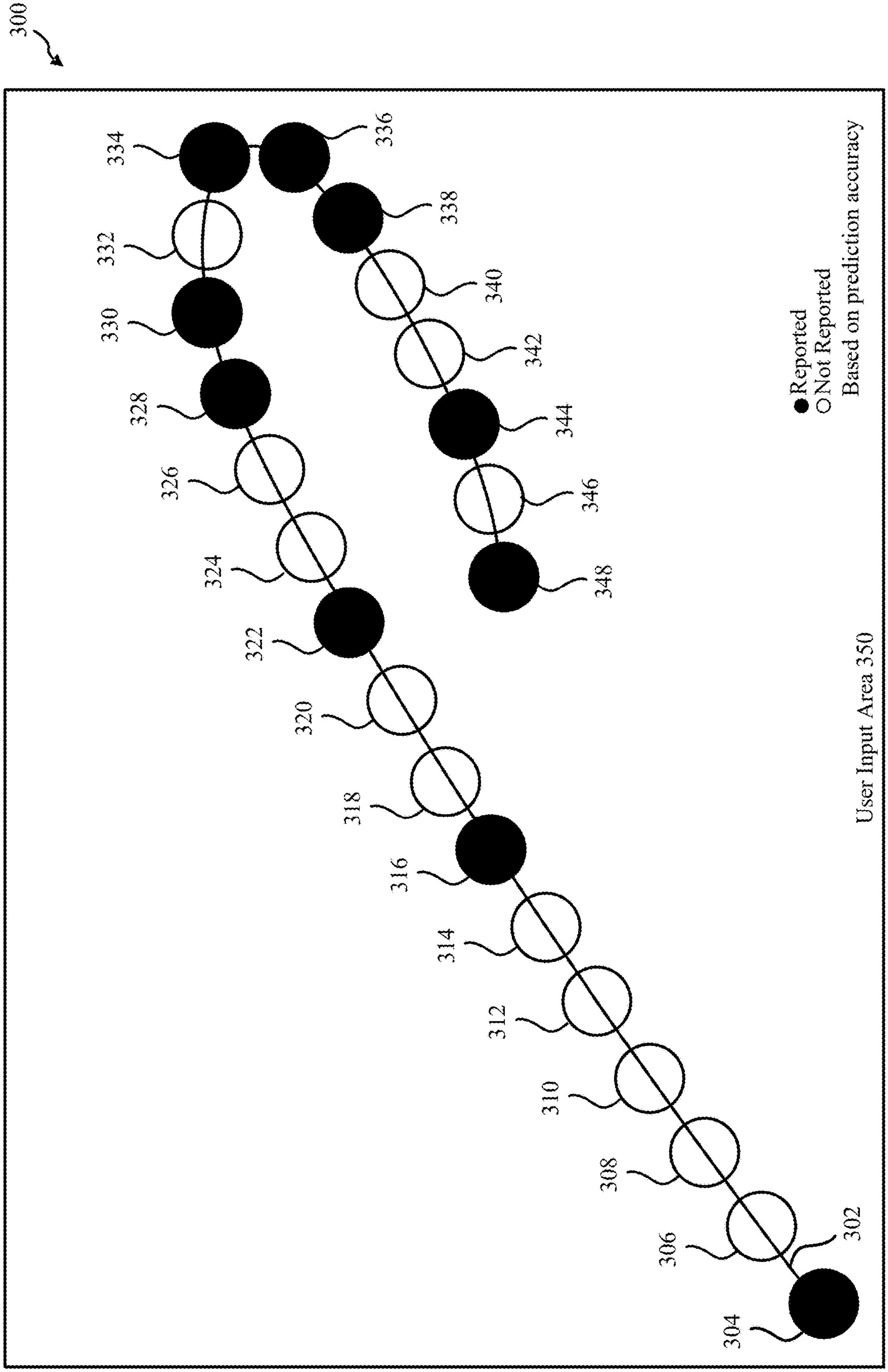
FIG. 3 shows an example of predictive reporting of detected touch inputs, in accordance with an embodiment.

In particular, FIG. 3 shows an example screen 300 (e.g., touch screen 106 of FIG. 1) in which predictive reporting of detected touch inputs is performed, in accordance with an embodiment. FIG. 3 shows an example of detected user input in user input area 350 of a digitizer of screen 300. In the example, the detected user input is shown as a line. Each circle (e.g., black or white) in FIG. 3 represents inking data 304-348 representative of detected user touch input (e.g., a fingertip or stylus tip) at an x,y coordinate location within user input area 350. Taken together, inking data 304-348 represents time-series data set generated as a user draws the line. Each inking datum (e.g., represented by a circle in FIG. 3) may comprise, e.g., at least in part, x,y coordinates indicating a location of user input area where the data was entered/detected in user input area 350.

As shown in FIG. 2, at 210, a user may perform an input operation 210 in a user input area of digitizer 204. Any type of touch input operation may be performed by user 202, including drawing by finger or stylus, etc. For example, the user may draw the line shown in FIG. 3. The user may begin drawing the line, for example, at circle 304.

At 212, digitizer 204 may generate inking data for the detected input. For example, digitizer 204 may generate inking data 304 for the portion/segment/increment of the line 302 where the user begins the line 302. Digitizer 204 may provide to or make available (e.g., store in memory) the inking data 304 for the detected input.

At 214, predictive reporter 206 may predict inking data, e.g., by generating inking data for a predicted input. For example, around the time digitizer generates inking data or after predictive reporter 206 receives inking data from digitizer at 212, predictive reporter 206 may provide a set of inking data representative of previously detected inputs to a predictive model that predicts the next/current user input, e.g., for comparison to the detected input.

At 216, predictive corrector 208, similar to predictive reporter 206, may predict inking data, e.g., by generating inking data for a predicted input. For example, around the time predictive reporter 206 predicts inking data, predictive corrector 208 may provide a set of inking data representative of previously detected inputs (e.g., and accurate predicted inputs) to a predictive model that predicts the next/current user input.

At 218, predictive reporter 206 may determine an error between the inking data generated by the digitizer (e.g., representing detected input) and the inking data generated by the predictive reporter 206 (e.g., representing predicted input). For example, predictive reporter 206 may determine as the error a distance (straight line) between the x,y coordinates of the detected input and the x,y coordinates of the predicted input.

At 220, predictive reporter 206 determines whether to send a report to the host predictive corrector 208. For example, predictive reporter 206 may compare the error to a threshold. Predictive reporter 206 may send a report to host predictive corrector 208, for example, if the error exceeds an allowable/threshold magnitude of error. Predictive reporter 206 may not send a report to host predictive corrector 208, for example, if the error (e.g., distance between detected and predicted coordinates) is below an allowable/threshold magnitude of error. As shown in FIG. 3, predictive reporter 206 sends a report for inking data 304 representing the initial starting segment of line 302. The report may indicate the detected input and/or the error.

At 222, predictive reporter 206 updates the model input(s) based on the inking data received at 212. The model input(s) may include a time-series set of detected inputs (e.g., and accurately predicted inputs).

At 224, host predictive corrector 208 may update the display and model input(s) for host predictive corrector 208 based on the report received at 220. The report may indicate the detected input and/or the error. Host predictive corrector 208 may use the detected input to replace the inaccurately predicted input. Host predictive corrector 208 may use the error to calculate a correction to the inaccurately predicted input. Accordingly, the display of user input and the model input(s) may be corrected to reflect the detected input. The model input(s) may include a time-series set of detected inputs (e.g., and accurately predicted inputs).

At 226, host predictive corrector 208 may update the display and model input(s) for host predictive corrector 208 based on the accurately predicted input when a report is not received. The accuracy of the predicted input is implied when a report is not received.

The process returns to 210 to process user input detected, such as at the circle corresponding to inking data 306. As indicated in FIG. 3, predictive reporter 206 does not send a report to host predictive corrector 208 for the inking data 306 because predictive reporter 206 and host predictive corrector 208 (e.g., using detected input 304 as input) accurately predicted the input within an acceptable margin of error indicated by the threshold. Thus, at 226, host predictive corrector 208 may update the display and model input(s) for host predictive corrector 208 based on the accurately predicted input at the location of inking data 306.

The process returns to 210 to process user input detected at the circle corresponding to inking data 308 and so on, until input is detected at the circle corresponding to inking data 348. As indicated in FIG. 3 by black and white circles, predictive reporter 206 continues to selectively/conditionally send reports to host predictive corrector 208 based on the accuracy of predicted input compared to detected input. Host predictive corrector 208 continues to selectively update the display and model input(s) for host predictive corrector 208 based on the accurately predicted input or based on the report. In some examples, the set of inputs to the models used by predictive reporter 206 and host predictive corrector 208 may be a moving window of input data, e.g., where an update to the set of inputs may add and remove inputs.

Figure 4:
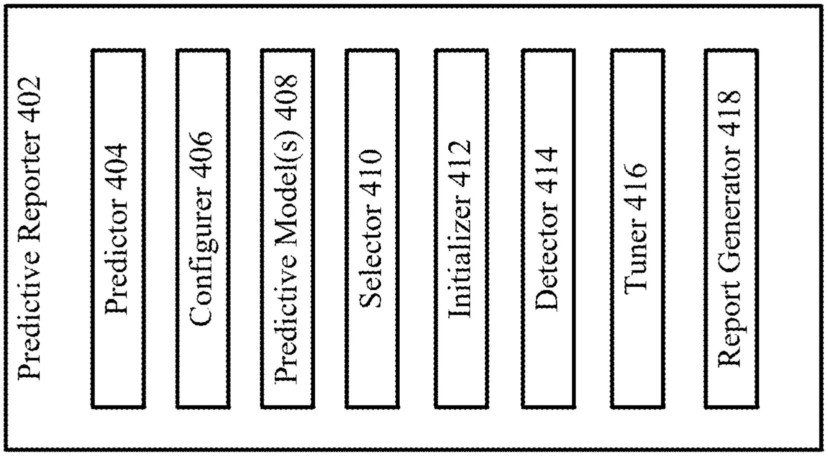
FIG. 4 shows a block diagram of an example predictive reporter associated with a digitizer, in accordance with an example embodiment.

Predictive reporter 136 of FIG. 1 (e.g., predictive reporter 206 of FIG. 2) may operate in various ways to perform its functions in embodiments. For instance, FIG. 4 shows a block diagram of an example predictive reporter 402 associated with a digitizer, in accordance with an embodiment. Predictive reporter 402 is partitioned into a set of operational components that perform one or more functions. Predictive reporter 402 may be implemented, for example, in a digitizer or an NPU. As shown in FIG. 4, predictive reporter 402 includes a digitizer-side components including a predictor 404, a configurer 406, one or more predictive models 408, a selector 410, an initializer 412, a detector 414, a tuner 416, and a report generator 418. These features of predictive reporter 402 are described in detail as follows.

Predictor 404 is configured to generate inking data representative of predicted input operations predicted to be performed in the user input area of the digitizer based at least on inking data generated by the digitizer representative of previously detected input operations in the user input area, which may be displayed by the host computing device. Predictor 404 may generate predictions using a predictive model. Predictor 404 may provide the predictive model with a set of inputs, which may include previously detected inputs and, in some examples, accurately predicted inputs. The inking data generated by predictor 404 may be in the form of a report or other form consistent with the format of inking data representative of detected user input.

Configurer 406 is configured to selectively configure the digitizer to use the predictive reporter, for example, based on at least one condition. Configurer 406 thereby enables customization of predictive reporting, which may be used to reduce or otherwise adapt power consumption, bandwidth usage, and/or use of processing resources. A digitizer and host may be capable of selecting between full reporting and conditional reporting, for example, based on a power state and/or battery life. For example, a host computing device with full power plugged into a power source and full processing capabilities may select full reporting of detected user inputs. A host computing device that detects a potential for a lag in displaying user input (e.g., due to processing, memory, bus, or other issues) may select predictive reporting.

Predictive model(s) 408 includes a set (e.g., one or more) of predictive models. A model may be any type of model that makes a prediction based on a time-series set of input data. Models may be flexible. For example, a model may be canonical. Models may implement a variety of canonical forms for prediction, such as polynomial regression, Fourier series, and/or other mathematical models. A model may be a custom/user-defined model. Various prediction models may be used to suit specific applications. A polynomial regression model may attempt to fit a polynomial curve to previous data points to predict the next point. A Fourier series model may model periodic data using Fourier series to predict future values. Machine learning models may use neural networks for complex pattern prediction. The use of machine learning enables ease of generation of predictive model(s) 408 through techniques of training rather than rote programming. Furthermore, having multiple models present enables selection in a particular session of a model deemed to most accurately predict what a user appears to be doing, as is further described elsewhere herein.

Models, for example, include one or more of a convolutional neural network (CNN) model, a long short-term memory (LSTM) model, or other suitable type of model. In some examples, one or more models may be trained. A trainer (not shown) may include executable program(s) to train models. For example, a trainer may perform supervised machine learning using labeled samples that indicate accurate predictions based on historical user input for various types of inputs that may be recognized and grouped or categorized. A trainer may divide samples into training, testing, and evaluation/validation sets of samples to confirm prediction accuracy of models during and/or after training. A trainer may train models based on positive examples (e.g., based on features indicating accurate predictions) and negative examples (e.g., based on features indicating inaccurate predictions).

Selector 410 is configured to select the predictive model from a plurality of predictive models 408. In an example, selector 410 implements selection logic to select a model from among a plurality of models. For instance, selector 410 selects a model from predictive models 408 deemed to most accurately predict what a user appears to be doing. For example, selector 410 may select a textual input predictor model when it appears a user is entering text, such as a list of items. Selector 410 may select a shape input predictor when it appears a user is entering shapes, such as shapes in a flowchart or component diagram.

Initializer 412 is configured to initialize the predictor (e.g., or the selected model) with a set of parameters (e.g., weights for model(s)). For example, the digitizer and the host computing device initialize their respective predictive models with the same set of parameters, e.g., to synchronize the models. Different models may have different training sets with different weights.

Detector 414 is configured to determine an error between the inking data representative of a detected input operation (e.g., generated by digitizer) and the inking data representative of a predicted input operation (e.g., generated by predictor 404). Detector 414 performs the error calculation based on the type of data in the inking data. In some examples, the type of data includes x,y coordinate data indicating the detected and predicted locations of user input in a user input area of the digitizer. In examples, detector 414 uses one or more error metrics to compare the predicted inking data (e.g., the predicted report) with the detected inking data (e.g., the actual report). Error metrics may include, for example, Euclidean distance and/or Mean Squared Error (MSE). The use of Euclidean distance enables calculation of distance between x,y coordinates with relatively low processing consumption. MSE is a risk function, corresponding to the expected value of the squared error loss, that decreases as error approaches zero, and also consumes relatively low processing resources. In an embodiment, detector 414 determines an error between x,y coordinates in predicted and detected inking data, for example, in accordance with Eq. (1):

$$\text{Error} = \sqrt{\left((\text{x\_actual} - \text{x\_predicted})^2 + (\text{y\_actual} - \text{y\_predicted})^2\right)} \quad (1)$$

Tuner 416 may be configured to adapt an acceptable error threshold based on at least one condition. Conditions may include, for example, a power state (e.g., plugged into power source or not), remaining battery power, etc. For example, tuner 416 may dynamically adapt a threshold to allow the acceptable error threshold to increase in a low power state and/or low battery life condition to reduce the number of reports and, thereby, reduce power consumption and conserve power. Adjusting the threshold may result in a tradeoff between accuracy and power consumption. A lower threshold error may increase the number of reports and power consumption while increasing accuracy.

Report generator 418 may be configured to provide a report associated with the detected input operation to the host computing device in response to the error exceeding a threshold. Report generator 418 compares the error determined by detector 414 to the threshold set by tuner 416. A report sent by report generator 418 may include inking data representative of the detected input, which may already be in the form of a report, and/or an indication of the error.

An advantage of transmitting fewer reports between a digitizer and host computer include an ability to transmit the fewer reports at a higher speed, e.g., due to increased bandwidth, which may help ensure that critical updates are delivered promptly. Transmitting fewer reports may also reduce latency, e.g., in displaying accurate renditions of user input, which may enhance user experience. Transmitting fewer reports may also reduce power consumption and data transmission volume, e.g., while maintaining accuracy and responsiveness to user input.

Figure 5:
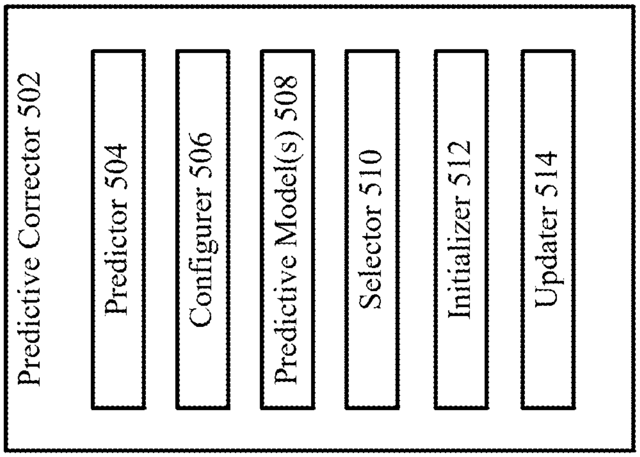
FIG. 5 shows a block diagram of an example of a predictive corrector associated with a host computing device, in accordance with an embodiment.

Predictive corrector 142 of FIG. 1 (e.g., predictive corrector 208 of FIG. 2) may operate in various ways to perform its functions in embodiments. For instance, FIG. 5 shows a block diagram of an example of a predictive corrector 502 associated with a host computing device, in accordance with an embodiment. In this example, predictive corrector 502 is partitioned into a set of operational components that perform one or more functions. Predictive corrector 502 may be implemented, for example, by a host processor or an NPU. As shown in FIG. 5, predictive corrector 502 includes host-side components including a predictor 504 (also referred to as host predictor), a configurer 506, one or more predictive models 508, a selector 510, an initializer 512, and an updater 514. These features of predictive corrector 502 are described in detail as follows.

Predictor 504 is configured to generate inking data representative of predicted input operations predicted to be performed in the user input area of the digitizer based at least on inking data generated by the digitizer representative of previously detected input operations in the user input area (e.g., and accurately predicted input), which is displayed by the host computing device. Predictor 504 may generate predictions using a predictive model. Predictor 504 may provide the predictive model with a set of inputs, which may include previously detected inputs and, in some examples, accurately predicted inputs. The inking data generated by predictor 504 is in the form of a report that is received. In an embodiment, predictor 504 is implemented as an electrical circuit, such as a graphics processor, an NPU, or other processing unit, which is configured for efficient execution of a predictive model.

Configurer 506 is configured to selectively configure the host computing device to use the predictive reporter, for example, based on at least one condition. In an embodiment, a digitizer and host are capable of selecting between full reporting and conditional reporting, for example, based on a power state and/or battery life. For instance, a host computing device with full power plugged into a power source and full processing capabilities selects full reporting of detected user inputs. A host computing device that detects a potential for a lag in displaying user input (e.g., due to processing, memory, bus, or other issues) may select predictive reporting.

Predictive model(s) 508 include a set (e.g., of one or more) predictive models. A model is any type of model that makes a prediction based on a time-series set of input data. Models may be flexible. For example, a model may be canonical and implement a variety of canonical forms for prediction, such as polynomial regression, Fourier series, and/or other mathematical models. In an embodiment, a model is a custom/user-defined model. Various prediction models are used to suit specific applications. A polynomial regression model may attempt to fit a polynomial curve to previous data points to predict the next point. A Fourier series model may model periodic data using Fourier series to predict future values. Machine learning Models may use neural networks for complex pattern prediction.

Selector 510 is configured to select the predictive model from a plurality of predictive models 508. Selector 510 may implement selection logic to select a model from among a plurality of models. Selector 510 may select a model from predictive models 508 deemed to most accurately predict what a user appears to be doing. For example, selector 510 may select a textual input predictor model when it appears a user is entering text, such as a list of items. Selector 510 may select a shape input predictor when it appears a user is entering shapes, such as shapes in a flowchart or component diagram. Predictive reporter 402 and predictive corrector 502 are configured to select the same model, which may be confirmed by one or more messages.

Initializer 512 is configured to initialize the predictor 504 (e.g., or the selected model) with a set of parameters. For example, the digitizer and the host computing device may initialize their respective predictive models with the same set of parameters, e.g., to synchronize the models.

Updater 514 is configured to update the inking data representative of previously detected input operations based on reports received from the predictive reporter. The report may indicate the detected input and/or the error. Updater 514 may use the detected input to replace the inaccurately predicted input. Updater 514 may use the error to calculate a correction to the inaccurately predicted input. Accordingly, the display of user input and the model input(s) is corrected to reflect the detected input. The model input(s) may include a time-series set of previously detected inputs (e.g., and accurately predicted inputs). Updater 514 may update the display and model input(s) for host predictive corrector 208 based on the accurately predicted input when a report is not received. The accuracy of the predicted input may be implied when a report is not received.

Figure 6:
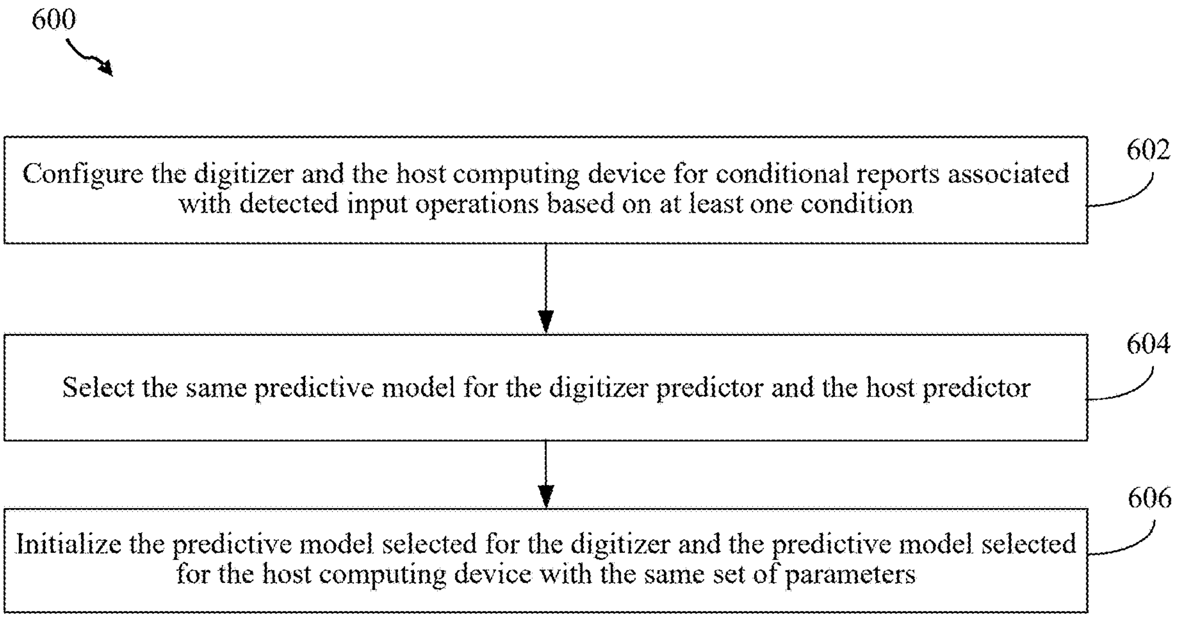
FIG. 6 shows a flowchart of a process for configuring and initializing a predictive reporter and predictive corrector, according to an embodiment.

FIG. 6 shows a flowchart 600 of a process for configuring and initializing a predictive reporter and predictive corrector, according to an embodiment. Digitizer 108/204, predictive reporter 136/208/402, and predictive corrector 142/502 may operate according to flowchart 600, e.g., in some embodiments. The example shown in FIG. 6 includes operations 602-606. Various embodiments may implement one or more operations shown in FIG. 6 with additional and/or alternative steps. Further structural and operational embodiments will be apparent to persons skilled in the relevant art(s) based on the following description of FIG. 6.

As shown in FIG. 6, at 602, the digitizer and the host computing device are configured for conditional reports associated with detected input operations based on at least one condition. For example, as shown in FIGS. 4 and 5, configurer 406 and configurer 506 may configure the digitizer to use predictive reporter 402 and the host computing device to use predictive corrector 502 for conditional reports associated with detected input operations based on at least one condition, such as user selection, power state, battery life, etc.

At 604, the same predictive model is selected for the digitizer predictor and the host predictor. For example, as shown in FIGS. 4 and 5, selector 410 and selector 510 may select the same predictive model from predictive model(s) 408 and predictive model(s) 508, respectively, for predictor 404 and predictor 504.

At 606, the predictive model selected for the digitizer and the predictive model selected for the host computing device are initialized with the same set of parameters. For example, as shown in FIGS. 4 and 5, initializer 412 and initializer 512 may, respectively, initialize the predictive model selected by selector 410 and the predictive model selected by selector 510 with the same set of parameters.

Figure 7:
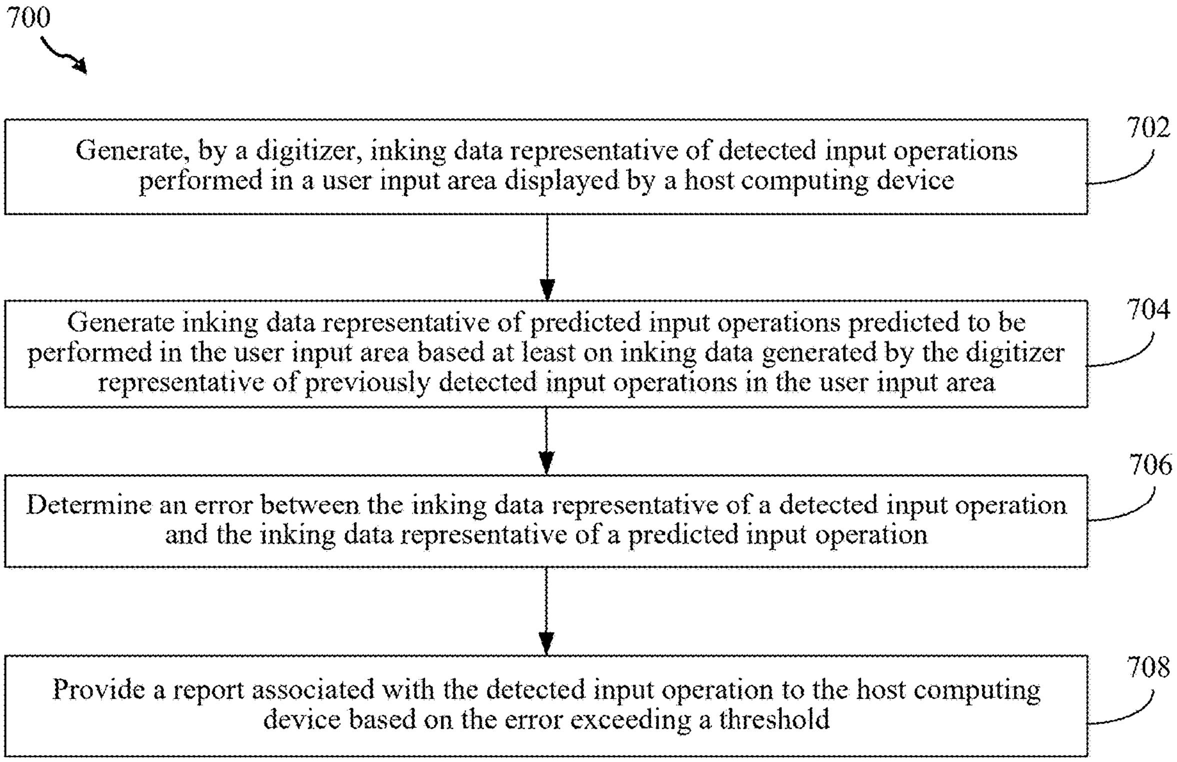
FIG. 7 shows a flowchart of a process for providing predictive reports, in accordance with an embodiment.

FIG. 7 shows a flowchart 700 of a process for providing predictive reports, in accordance with an embodiment. Digitizer 108/204, predictive reporter 136/208/402, and predictive corrector 142/502 may operate according to flowchart 700, e.g., in some embodiments. The example shown in FIG. 7 includes operations 702-708. Various embodiments may implement one or more operations shown in FIG. 7 with additional and/or alternative steps. Further structural and operational embodiments will be apparent to persons skilled in the relevant art(s) based on the following description of FIG. 7.

As shown in FIG. 7, at 702, a digitizer may generate inking data representative of detected input operations performed in a user input area displayed by a host computing device. For example, as shown in FIG. 1, digitizer processor 108 may generate inking data representative of detected input operations performed in user input area 112 displayed by host computing device 102 in touch screen 106.

At 704, inking data representative of predicted input operations predicted to be performed in the user input area is generated based at least on inking data generated by the digitizer representative of previously detected input operations in the user input area. For example, as shown in FIG. 1, predictive reporter 136 may generate inking data representative of predicted input operations predicted to be performed in the user input area 112 based at least on inking data generated by the digitizer processor 108 representative of previously detected input operations in the user input area 112.

At 706, an error between the inking data representative of a detected input operation and the inking data representative of a predicted input operation is determined. For example, as shown in FIG. 1, predictive reporter 136 (e.g., detector 414 in predictive reporter 402) may determine an error between the inking data representative of a detected input operation and the inking data representative of a predicted input operation.

At 708, a report associated with the detected input operation is provided to the host computing device based on the error exceeding a threshold. For example, as shown in FIG. 2, at 220, predictive reporter 206 may provide a report associated with the detected input operation to the host predictive corrector 208 based on the error exceeding a threshold.

Figure 8:
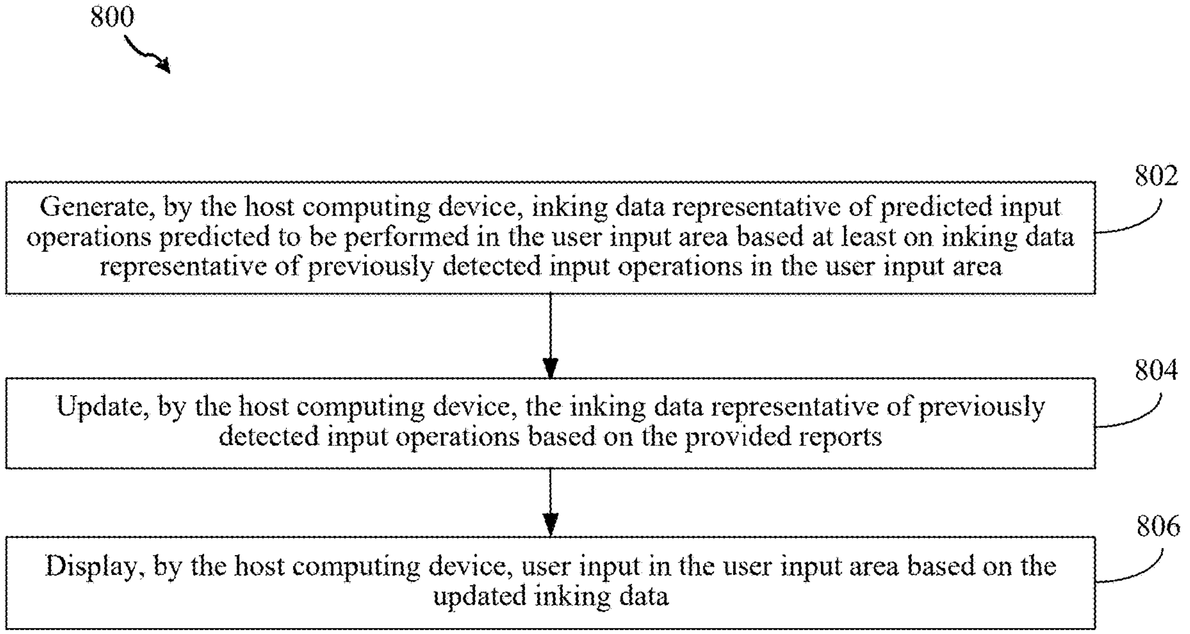
FIG. 8 shows a flowchart of a process for using reports to update inking data for subsequent inking data predictions, in accordance with an embodiment.

FIG. 8 shows a flowchart 800 of a process for using reports to update inking data for subsequent inking data predictions, in accordance with an embodiment. Digitizer 108/204, predictive reporter 136/208/402, and predictive corrector 142/502 may operate according to flowchart 800, e.g., in some embodiments. The example shown in FIG. 8 includes operations 802-806. Various embodiments may implement one or more operations shown in FIG. 8 with additional and/or alternative steps. Further structural and operational embodiments will be apparent to persons skilled in the relevant art(s) based on the following description of FIG. 8.

As shown in FIG. 8, at 802, the host computing device may generate inking data representative of predicted input operations predicted to be performed in the user input area based at least on inking data representative of previously detected input operations in the user input area. For example, as shown in FIG. 2, at 216, host predictive corrector 208 may generate inking data representative of predicted input operations predicted to be performed in the user input area 112 based at least on inking data representative of previously detected input operations in the user input area 112.

At 804, the host computing device may update the inking data representative of previously detected input operations based on the provided reports. For example, as shown in FIG. 2, at 224, host predictive corrector 208 may update the inking data representative of previously detected input operations based on the provided reports.

At 806, the host computing device may display user input in the user input area based on the updated inking data. For example, as shown in FIG. 2, at 224, host predictive corrector 208 may display user input in the user input area based on the updated inking data.

III. Example Computing Device Embodiments

Predictive reporter 136/206/402, predictive corrector 142/208/502, predictor 404, configurer 406, predictive model(s) 408, selector 410, initializer 412, detector 414, tuner 416, report generator 418, predictor 504, configurer 506, predictive model(s) 508, selector 510, initializer 512, updater 514, and flowcharts 200, 600, 700, and 800 are each implemented as computer program code/instructions configured to be executed in one or more processors and stored in a computer readable storage medium. Alternatively, predictive reporter 136/206/402, predictive corrector 142/208/502, predictor 404, configurer 406, predictive model(s) 408, selector 410, initializer 412, detector 414, tuner 416, report generator 418, predictor 504, configurer 506, predictive model(s) 508, selector 510, initializer 512, updater 514, and flowcharts 200, 600, 700, and 800 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 9:
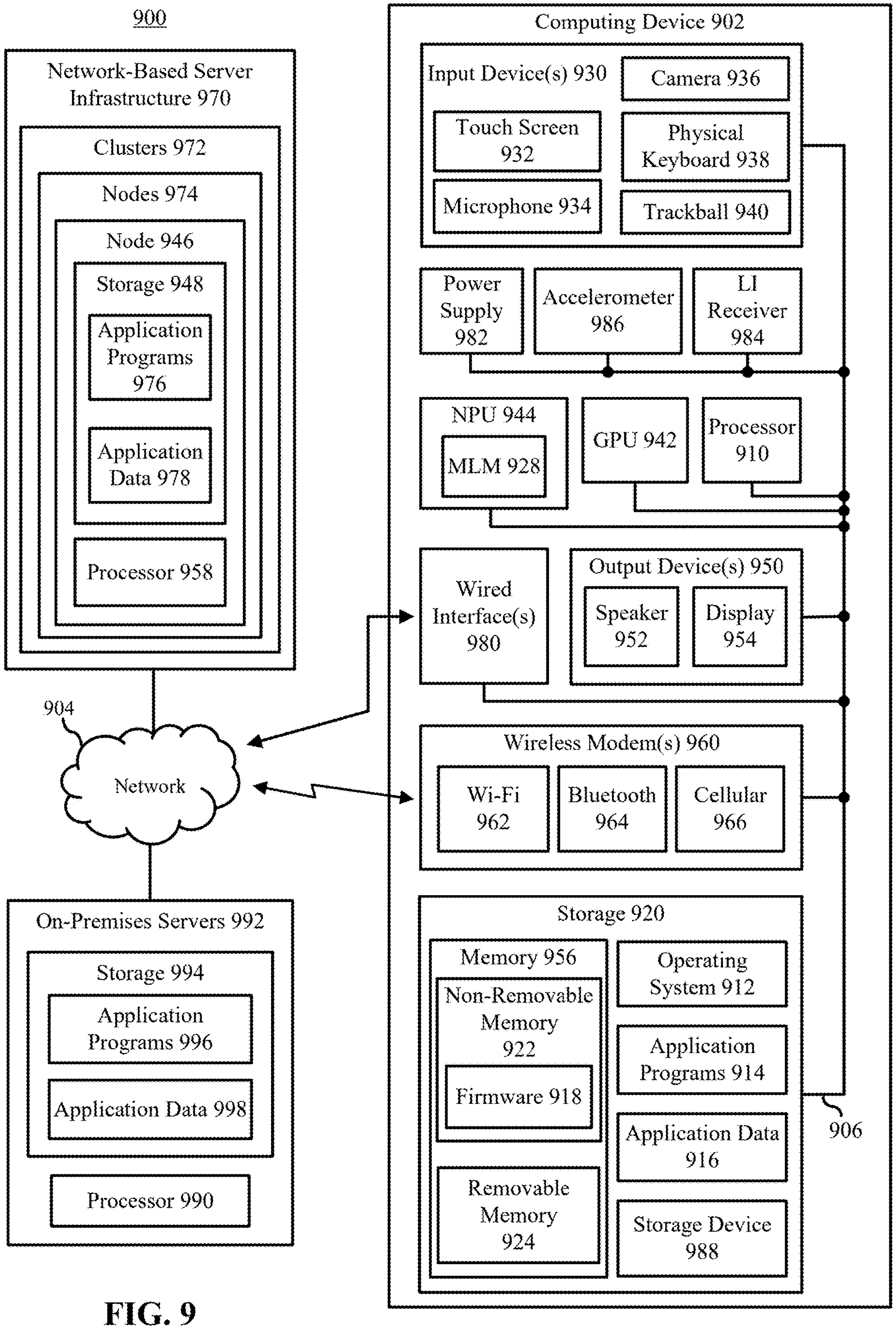
FIG. 9 shows a block diagram of an example computer system in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 9. FIG. 9 shows a block diagram of an exemplary computing environment 900 that includes a computing device 902. Computing device 902 is an example of host computing device 102, which may include one or more of the components of computing device 902. Furthermore, stylus 130 of FIG. 1 may include features of computing device 902. In some embodiments, computing device 902 is communicatively coupled with devices (not shown in FIG. 9) external to computing environment 900 via network 904. Network 904 comprises one or more networks such as local area networks (LANs), wide area networks (WANs), enterprise networks, the Internet, etc. In examples, network 904 includes one or more wired and/or wireless portions. In some examples, network 904 additionally or alternatively includes a cellular network for cellular communications. Computing device 902 is described in detail as follows.

Computing device 902 is any of a variety of types of computing devices. Examples of computing device 902 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 902 is a stationary computing device such as a desktop computer, a personal computer (PC), a stationary server device, a minicomputer, a mainframe, a supercomputer, etc.

As shown in FIG. 9, computing device 902 includes a variety of hardware and software components, including a processor 910, a storage 920, a graphics processing unit (GPU) 942, a neural processing unit (NPU) 944, one or more input devices 930, one or more output devices 950, one or more wireless modems 960, one or more wired interfaces 980, a power supply 982, a location information (LI) receiver 984, and an accelerometer 986. Storage 920 includes memory 956, which includes non-removable memory 922 and removable memory 924, and a storage device 988. Storage 920 also stores an operating system 912, application programs 914, and application data 916. Wireless modem(s) 960 include a Wi-Fi modem 962, a Bluetooth modem 964, and a cellular modem 966. Output device(s) 950 includes a speaker 952 and a display 954. Input device(s) 930 includes a touch screen 932, a microphone 934, a camera 936, a physical keyboard 938, and a trackball 940. Not all components of computing device 902 shown in FIG. 9 are present in all embodiments, additional components not shown may be present, and in a particular embodiment any combination of the components are present. In examples, components of computing device 902 are mounted to a circuit card (e.g., a motherboard) of computing device 902, integrated in a housing of computing device 902, or otherwise included in computing device 902. The components of computing device 902 are described as follows.

In embodiments, a single processor 910 (e.g., central processing unit (CPU), microcontroller, a microprocessor, signal processor, ASIC (application specific integrated circuit), and/or other physical hardware processor circuit) or multiple processors 910 are present in computing device 902 for performing such tasks as program execution, signal coding, data processing, input/output processing, power control, and/or other functions. In examples, processor 910 is a single-core or multi-core processor, and each processor core is single-threaded or multithreaded (to provide multiple threads of execution concurrently). Processor 910 is configured to execute program code stored in a computer readable medium, such as program code of operating system 912 and application programs 914 stored in storage 920. The program code is structured to cause processor 910 to perform operations, including the processes/methods disclosed herein. Operating system 912 controls the allocation and usage of the components of computing device 902 and provides support for one or more application programs 914 (also referred to as "applications" or "apps"). In examples, application programs 914 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 910 includes one or more general processors (e.g., CPUs) configured with or coupled to one or more hardware accelerators, such as one or more NPUs 944 and/or one or more GPUs 942.

Any component in computing device 902 can communicate with any other component according to function, although not all connections are shown for ease of illustration. For instance, as shown in FIG. 9, bus 906 is a multiple signal line communication medium (e.g., conductive traces in silicon, metal traces along a motherboard, wires, etc.) present to communicatively couple processor 910 to various other components of computing device 902, although in other embodiments, an alternative bus, further buses, and/or one or more individual signal lines is/are present to communicatively couple components. Bus 906 represents one or more of any of several types of bus structures, including a memory bus or memory controller, a peripheral bus, an accelerated graphics port, and a processor or local bus using any of a variety of bus architectures.

Storage 920 is physical storage that includes one or both of memory 956 and storage device 988, which store operating system 912, application programs 914, and application data 916 according to any distribution. Non-removable memory 922 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 922 includes main memory and is separate from or fabricated in a same integrated circuit as processor 910. As shown in FIG. 9, non-removable memory 922 stores firmware 918 that is present to provide low-level control of hardware. Examples of firmware 918 include BIOS (Basic Input/Output System, such as on personal computers) and boot firmware (e.g., on smart phones). In examples, removable memory 924 is inserted into a receptacle of or is otherwise coupled to computing device 902 and can be removed by a user from computing device 902. Removable memory 924 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 988 are present that are internal and/or external to a housing of computing device 902 and are or are not removable. Examples of storage device 988 include a hard disk drive, a SSD, a thumb drive (e.g., a USB (Universal Serial Bus) flash drive), or other physical storage device.

One or more programs are stored in storage 920. Such programs include operating system 912, one or more application programs 914, and other program modules and program data. Examples of such application programs include computer program logic (e.g., computer program code/instructions) for implementing predictive reporter 136/206/402, predictive corrector 142/208/502, predictor 404, configurer 406, predictive model(s) 408, selector 410, initializer 412, detector 414, tuner 416, report generator 418, predictor 504, configurer 506, predictive model(s) 508, selector 510, initializer 512, updater 514, and flowcharts 200, 600, 700, and 800 (and/or any individual operations/steps thereof).

Storage 920 also stores data used and/or generated by operating system 912 and application programs 914 as application data 916. Examples of application data 916 include web pages, text, images, tables, sound files, video data, and other data. In examples, application data 916 is sent to and/or received from one or more network servers or other devices via one or more wired or wireless networks. Storage 920 is used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 902 through one or more input devices 930 and receives information from computing device 902 through one or more output devices 950. Input device(s) 930 includes one or more of touch screen 932, microphone 934, camera 936, physical keyboard 938, and/or trackball 940 and output device(s) 950 includes one or more of speaker 952 and display 954. Each of input device(s) 930 and output device(s) 950 are integral to computing device 902 (e.g., built into a housing of computing device 902) or are external to computing device 902 (e.g., communicatively coupled wired or wirelessly to computing device 902 via wired interface(s) 980 and/or wireless modem(s) 960). Further input devices 930 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 954 displays information, as well as operating as touch screen 932 by receiving user commands and/or other information (e.g., by touch, finger gestures, virtual keyboard, etc.) as a user interface. Any number of each type of input device(s) 930 and output device(s) 950 are present, including multiple microphones 934, multiple cameras 936, multiple speakers 952, and/or multiple displays 954.

In embodiments where GPU 942 is present, GPU 942 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 942 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 944 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 928. In an example, NPU 944 is configured for a data-driven parallel computing and is highly efficient at processing massive multimedia data such as videos and images and processing data for neural networks. NPU 944 is configured for efficient handling of AI-related tasks, such as speech recognition, background blurring in video calls, photo or video editing processes like object detection, etc.

In embodiments disclosed herein that implement ML models, NPU 944 can be utilized to execute such ML models, of which MLM 928 is an example. For instance, where applicable, MLM 928 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 944 is used to train MLM 928. To train MLM 928, training data is that includes input features (attributes) and their corresponding output labels/target values (e.g., for supervised learning) is collected. A training algorithm is a computational procedure that is used so that MLM 928 learns from the training data. Examples of training inputs for ML model training include user position, angle, gesture, time of day, location, user crypto, etc. Parameters/weights are internal settings of MLM 928 that are adjusted during training by the training algorithm to reduce a difference between predictions by MLM 928 and actual outcomes (e.g., output labels). In some examples, MLM 928 is set with initial values for the parameters/weights. A loss function measures a dissimilarity between predictions by MLM 928 and the target values, and the parameters/weights of MLM 928 are adjusted to minimize the loss function. The parameters/weights are iteratively adjusted by an optimization technique, such as gradient descent. In this manner, MLM 928 is generated through training by NPU 944 to be used to generate inferences based on received input feature sets for particular applications. MLM 928 is generated as a computer program or other type of algorithm configured to generate an output (e.g., a classification, a prediction/inference) based on received input features and is stored in the form of a file or other data structure.

In examples, such training of MLM 928 by NPU 944 is supervised or unsupervised. According to supervised learning, input objects (e.g., a vector of predictor variables) and a desired output value (e.g., a human-labeled supervisory signal) train MLM 928. The training data is processed, building a function that maps new data on expected output values. Example algorithms usable by NPU 944 to perform supervised training of MLM 928 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 928 is an LLM, MLM 928 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 928 is trained to learn patterns from unlabeled data. For instance, in embodiments where MLM 928 implements unsupervised learning techniques, MLM 928 identifies one or more classifications or clusters to which an input belongs. During a training phase of MLM 928 according to unsupervised learning, MLM 928 tries to mimic the provided training data and uses the error in its mimicked output to correct itself (i.e., correct weights and biases). In further examples, NPU 944 perform unsupervised training of MLM 928 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 944 need not necessarily be present in all ML model embodiments. In embodiments where ML models are present, any one or more of processor 910, GPU 942, and/or NPU 944 can be present to train and/or execute MLM 928.

One or more wireless modems 960 can be coupled to antenna(s) (not shown) of computing device 902 and can support two-way communications between processor 910 and devices external to computing device 902 through network 904, as would be understood to persons skilled in the relevant art(s). Wireless modem 960 is shown generically and can include a cellular modem 966 for communicating with one or more cellular networks, such as a GSM network for data and voice communications within a single cellular network, between cellular networks, or between the mobile device and a public switched telephone network (PSTN). In examples, wireless modem 960 also or alternatively includes other radio-based modem types, such as a Bluetooth modem 964 (also referred to as a "Bluetooth device") and/or Wi-Fi modem 962 (also referred to as an "wireless adaptor"). Wi-Fi modem 962 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 964 is configured to communicate with another Bluetooth-capable device according to the Bluetooth short-range wireless technology standard(s) such as IEEE 802.15.1 and/or managed by the Bluetooth Special Interest Group (SIG).

Computing device 902 can further include power supply 982, LI receiver 984, accelerometer 986, and/or one or more wired interfaces 980. Example wired interfaces 980 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 980 of computing device 902 provide for wired connections between computing device 902 and network 904, or between computing device 902 and one or more devices/peripherals when such devices/peripherals are external to computing device 902 (e.g., a pointing device, display 954, speaker 952, camera 936, physical keyboard 938, etc.). Power supply 982 is configured to supply power to each of the components of computing device 902 and receives power from a battery internal to computing device 902, and/or from a power cord plugged into a power port of computing device 902 (e.g., a USB port, an A/C power port). LI receiver 984 is useable for location determination of computing device 902 and in examples includes a satellite navigation receiver such as a Global Positioning System (GPS) receiver and/or includes other type of location determiner configured to determine location of computing device 902 based on received information (e.g., using cell tower triangulation, etc.). Accelerometer 986, when present, is configured to determine an orientation of computing device 902.

Note that the illustrated components of computing device 902 are not required or all-inclusive, and fewer or greater numbers of components can be present as would be recognized by one skilled in the art. In examples, computing device 902 includes one or more of a gyroscope, barometer, proximity sensor, ambient light sensor, digital compass, etc. In an example, processor 910 and memory 956 are co-located in a same semiconductor device package, such as being included together in an integrated circuit chip, FPGA, or system-on-chip (SOC), optionally along with further components of computing device 902.

In embodiments, computing device 902 is configured to implement any of the above-described features of flowcharts herein. Computer program logic for performing any of the operations, steps, and/or functions described herein is stored in storage 920 and executed by processor 910.

In some embodiments, server infrastructure 970 is present in computing environment 900 and is communicatively coupled with computing device 902 via network 904. Server infrastructure 970, when present, is a network-accessible server set (e.g., a cloud-based environment or platform). As shown in FIG. 9, server infrastructure 970 includes clusters 972. Each of clusters 972 comprises a group of one or more compute nodes and/or a group of one or more storage nodes. For example, as shown in FIG. 9, cluster 972 includes nodes 974. Each of nodes 974 are accessible via network 904 (e.g., in a "cloud-based" embodiment) to build, deploy, and manage applications and services. In examples, any of nodes 974 is a storage node that comprises a plurality of physical storage disks, SSDs, and/or other physical storage devices that are accessible via network 904 and are configured to store data associated with the applications and services managed by nodes 974.

Each of nodes 974, as a compute node, comprises one or more server computers, server systems, and/or computing devices. For instance, a node 974 in accordance with an embodiment includes one or more of the components of computing device 902 disclosed herein. Each of nodes 974 is configured to execute one or more software applications (or "applications") and/or services and/or manage hardware resources (e.g., processors, memory, etc.), which are utilized by users (e.g., customers) of the network-accessible server set. In examples, as shown in FIG. 9, nodes 974 includes a node 946 that includes storage 948 and/or one or more of a processor 958 (e.g., similar to processor 910, GPU 942, and/or NPU 944 of computing device 902). Storage 948 stores application programs 976 and application data 978. Processor(s) 958 operates application programs 976 which access and/or generate related application data 978. In an implementation, nodes such as node 946 of nodes 974 operate or comprise one or more virtual machines, with each virtual machine emulating a system architecture (e.g., an operating system), in an isolated manner, upon which applications such as application programs 976 are executed.

In embodiments, one or more of clusters 972 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 972 are included in a datacenter in a distributed collection of datacenters. In embodiments, exemplary computing environment 900 comprises part of a cloud-based platform.

In an embodiment, computing device 902 accesses application programs 976 for execution in any manner, such as by a client application and/or a browser at computing device 902.

In an example, for purposes of network (e.g., cloud) backup and data security, computing device 902 additionally and/or alternatively synchronizes copies of application programs 914 and/or application data 916 to be stored at network-based server infrastructure 970 as application programs 976 and/or application data 978. In examples, operating system 912 and/or application programs 914 include a file hosting service client configured to synchronize applications and/or data stored in storage 920 at network-based server infrastructure 970.

In some embodiments, on-premises servers 992 are present in computing environment 900 and are communicatively coupled with computing device 902 via network 904. On-premises servers 992, when present, are hosted within an organization's infrastructure and, in many cases, physically onsite of a facility of that organization. On-premises servers 992 are controlled, administered, and maintained by IT (Information Technology) personnel of the organization or an IT partner to the organization. Application data 998 can be shared by on-premises servers 992 between computing devices of the organization, including computing device 902 (when part of an organization) through a local network of the organization, and/or through further networks accessible to the organization (including the Internet). Furthermore, in examples, on-premises servers 992 serve applications such as application programs 996 to the computing devices of the organization, including computing device 902. Accordingly, in examples, on-premises servers 992 include storage 994 (which includes one or more physical storage devices such as storage disks and/or SSDs) for storage of application programs 996 and application data 998 and include a processor 990 (e.g., similar to processor 910, GPU 942, and/or NPU 944 of computing device 902) for execution of application programs 996. In some embodiments, multiple processors 990 are present for execution of application programs 996 and/or for other purposes. In further examples, computing device 902 is configured to synchronize copies of application programs 914 and/or application data 916 for backup storage at on-premises servers 992 as application programs 996 and/or application data 998.

Embodiments described herein may be implemented in one or more of computing device 902, network-based server infrastructure 970, and on-premises servers 992. For example, in some embodiments, computing device 902 is used to implement systems, clients, or devices, or components/subcomponents thereof, disclosed elsewhere herein. In other embodiments, a combination of computing device 902, network-based server infrastructure 970, and/or on-premises servers 992 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (micro-electronic machine) memory, nanotechnology-based storage devices, and further types of physical/tangible hardware storage media of storage 920. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules, or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 914) are stored in storage 920. Such computer programs can also be received via wired interface(s) 960 and/or wireless modem(s) 960 over network 904. Such computer programs, when executed or loaded by an application, enable computing device 902 to implement features of embodiments discussed herein. Accordingly, such computer programs represent controllers of the computing device 902.

Embodiments are also directed to computer program products comprising computer code or instructions stored on any computer-readable medium or computer-readable storage medium. Such computer program products include the physical storage of storage 920 as well as further physical storage types.

IV. Additional Example Embodiments

Systems, methods, systems, and computer program products are provided for enabling enable predictive reporting for digital inking data representative of detected touch input operations. Predictive reporting of inking data reduces the number of reports sent by the digitizer to the host computer. A predictive reporting system for inking data minimizes data transmission, reduces latency, increases bandwidth (e.g., for critical information), reduces power consumption, and supports high performance (e.g., accuracy, responsiveness). An inking input predictor is employed on both the digitizer and the host computer. Reports are sent when the error between a predicted and an actual report exceeds a threshold. Predictions may be made by prediction models, such as polynomial regression, Fourier series, and/or user-defined models. Models may be selected based on one or more conditions, providing adaptability to different input data types and user requirements.

In some examples, a system with predictive reporting of inking data may comprise a digitizer, a processor circuit (e.g., digitizer processor or NPU), and a memory. The digitizer may be configured to generate inking data representative of detected input operations performed in a user input area displayed by a host computing device. The memory stores program code that is executable by the processor circuit. The program code may comprise a predictor, a detector, and a report generator. The predictor is configured to generate inking data representative of predicted input operations predicted to be performed in the user input area based at least on inking data generated by the digitizer representative of previously detected input operations in the user input area. The detector is configured to determine an error between the inking data representative of a detected input operation and the inking data representative of a predicted input operation. The report generator is configured to provide a report associated with the detected input operation to the host computing device in response to the error exceeding a threshold.

In some examples, the inking data representative of the detected input operation and the inking data representative of the predicted input operation are in the format of the report.

In some examples, the report indicates the error.

In some examples, the predictive reporter further comprises a configurer that selectively configures the digitizer to use the predictive reporter based at least on at least one condition.

In some examples, the predictor uses a predictive model to generate the inking data representative of predicted input operations. The predictive reporter further comprises a selector configured to select the predictive model from a plurality of predictive models.

In some examples, the predictive reporter further comprises a tuner configured to adapt the threshold based at least on at least one condition.

In some examples, the inking data representative of detected input operations comprises detected coordinates representative of a location where the detected input operation was performed in the user input area. The inking data representative of predicted input operations comprises predicted coordinates representative of a location where the predicted input operation was predicted to be performed in the user input area. The error is determined based at least on a Euclidean distance or Mean Squared Error (MSE) between the detected coordinates and the predicted coordinates.

In some examples, the predictive reporter is implemented in the digitizer.

In some examples, the system further comprises the host computing device, which includes a host predictor and an updater. The host predictor is configured to generate inking data representative of predicted input operations predicted to be performed in the user input area based at least on inking data representative of previously detected input operations in the user input area. The updater is configured to update the inking data representative of previously detected input operations based at least on reports received from the predictive reporter.

In some examples, the predictive reporter further comprises a first initializer configured to initialize the predictor with a set of parameters. The host computing device further comprises a second initializer configured to initialize the host predictor with the set of parameters.

In some examples, a system with predictive reporting of inking data may comprise a host computing device, with a processor circuit (e.g., host processor or NPU) and a memory. The memory stores program code that is executable by the processor circuit. The program code may comprise a host predictor and an updater. The host predictor is configured to generate inking data representative of predicted input operations predicted to be performed in a user input area based at least on inking data generated by a digitizer representative of previously detected input operations in the user input area. The updater is configured to update the inking data representative of previously detected input operations based at least on reports provided by the digitizer.

In some examples, wherein the host computing device further comprises an initializer configured to initialize the host predictor with a set of parameters that the digitizer uses to initialize.

In some examples, the host predictor uses a predictive model to generate the inking data representative of predicted input operations. The host computing system further comprises a selector configured to select the predictive model from a plurality of predictive models that the digitizer also uses to generate inking data representative of predicted input operations.

In some examples, the system further comprises a digitizer configured to generate inking data representative of detected input operations performed in the user input area displayed by a host computing device, the digitizer is configured to generate inking data representative of predicted input operations predicted to be performed in the user input area based at least on inking data generated by the digitizer representative of previously detected input operations in the user input area. The digitizer is configured to determine an error between the inking data representative of a detected input operation and the inking data representative of a predicted input operation. The digitizer is configured to provide a report associated with the detected input operation to the host computing device based at least on the error exceeding a threshold.

A method may comprise, for example, generating, by a digitizer, inking data representative of detected input operations performed in a user input area displayed by a host computing device; generating inking data representative of predicted input operations predicted to be performed in the user input area based at least on inking data generated by the digitizer representative of previously detected input operations in the user input area; determining an error between the inking data representative of a detected input operation and the inking data representative of a predicted input operation; and providing a report associated with the detected input operation to the host computing device based at least on the error exceeding a threshold.

In some examples, the method may further comprise selectively configuring the digitizer and the host computing device for conditional reports associated with detected input operations based at least on at least one condition.

In some examples, the method may further comprise tuning the threshold based at least on at least one condition.

In some examples, the method may further comprise generating, by the host computing device, inking data representative of predicted input operations predicted to be performed in the user input area based at least on inking data representative of previously detected input operations in the user input area; and updating, by the host computing device, the inking data representative of previously detected input operations based at least on the provided reports.

In some examples, the predictor and the host predictor use a predictive model to generate the inking data representative of predicted input operations. The method may further comprise selecting the same predictive model for the predictor and the host predictor.

In some examples, the method may further comprise initializing the predictive model selected for the digitizer and the predictive model selected for the host computing device with the same set of parameters.

A computer-readable storage medium is described herein. The computer-readable storage medium has computer program logic recorded thereon that when executed by a processor circuit causes the processor circuit to perform a method. The method may comprise, for example, any combination of operations described herein.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. The section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (e.g., or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (e.g., computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system, comprising:

a digitizer configured to generate inking data representative of detected input operations performed in a user input area displayed by a host computing device; and a predictive reporter comprising:

a predictor configured to generate inking data representative of predicted input operations predicted to be performed in the user input area based at least on inking data generated by the digitizer representative of previously detected input operations in the user input area;

a detector configured to determine an error between the inking data representative of a detected input operation and the inking data representative of a predicted input operation; and a report generator configured to provide a report associated with the detected input operation to the host computing device in response to the error exceeding a threshold, wherein the threshold is adjustable based on a power condition of the host computing device.

2. The system of claim 1, wherein the inking data representative of the detected input operation and the inking data representative of the predicted input operation are in the format of the report.

3. The system of claim 1, wherein the report indicates the error.

4. The system of claim 1, further comprising:

a configurer that selectively configures the digitizer to use the predictive reporter based at least on at least one condition.

5. The system of claim 1, wherein the predictor uses a predictive model to generate the inking data representative of predicted input operations, wherein the predictive reporter further comprises:

a selector configured to select the predictive model from a plurality of predictive models.

6. The system of claim 1, wherein the predictive reporter further comprises:

a tuner configured to adjust the threshold based on the power condition, including increasing the threshold based on a reduction of the power condition; and wherein the power condition includes at least one of a power state of the host computing device or a battery charge level of the host computing device.

7. The system of claim 1, wherein the inking data representative of detected input operations comprises detected coordinates representative of a location where the detected input operation was performed in the user input area, wherein the inking data representative of predicted input operations comprises predicted coordinates representative of a location where the predicted input operation was predicted to be performed in the user input area, and wherein the error is determined based at least on a Euclidean distance or Mean Squared Error (MSE) between the detected coordinates and the predicted coordinates.

8. The system of claim 1, wherein the predictive reporter is implemented in the digitizer.

9. The system of claim 1, further comprising:

the host computing device, comprising:

a host predictor configured to generate inking data representative of predicted input operations predicted to be performed in the user input area based at least on inking data representative of previously detected input operations in the user input area; and an updater configured to update the inking data representative of previously detected input operations based at least on reports received from the predictive reporter.

10. The system of claim 9, wherein the predictive reporter further comprises:

a first initializer configured to initialize the predictor with a set of parameters; and wherein the host computing device further comprises:

a second initializer configured to initialize the host predictor with the set of parameters.

11. A system, comprising:

a host computing device, comprising:

a host predictor configured to generate inking data representative of predicted input operations predicted to be performed in a user input area based at least on inking data generated by a digitizer representative of previously detected input operations in the user input area, the digitizer configured to determine an error between inking data representative of a detected input operation and the inking data representative of a predicted input operation and provide a report associated with the detected input operation to the host computing device based at least on the error exceeding a threshold, wherein the threshold is adjustable based on a power condition of the host computing device; and an updater configured to update the inking data representative of previously detected input operations based at least on reports provided by the digitizer.

12. The system of claim 11, wherein the host computing device further comprises:

an initializer configured to initialize the host predictor with a set of parameters that the digitizer uses to initialize; and wherein the power condition includes at least one of a power state of the host computing device or a battery charge level of the host computing device.

13. The system of claim 11, wherein the host predictor uses a predictive model to generate the inking data representative of predicted input operations, wherein the host computing device further comprises:

a selector configured to select the predictive model from a plurality of predictive models that the digitizer also uses to generate inking data representative of predicted input operations.

14. The system of claim 11, further comprising:

the digitizer configured to:

generate the inking data representative of detected input operations performed in the user input area displayed by a host computing device; and generate the inking data representative of predicted input operations predicted to be performed in the user input area based at least on inking data generated by the digitizer representative of previously detected input operations in the user input area.

15. A method, comprising:

generating, by a digitizer, inking data representative of detected input operations performed in a user input area displayed by a host computing device;

generating inking data representative of predicted input operations predicted to be performed in the user input area based at least on inking data generated by the digitizer representative of previously detected input operations in the user input area;

determining an error between the inking data representative of a detected input operation and the inking data representative of a predicted input operation;

providing a report associated with the detected input operation to the host computing device based at least on the error exceeding a threshold; and adjusting the threshold based on a power condition of the host computing device.

16. The method of claim 15, further comprising:

selectively configuring the digitizer and the host computing device for conditional reports associated with detected input operations based at least on at least one condition.

17. The method of claim 15, wherein:

the adjusting the threshold includes dynamically adjusting the threshold based on a low power state of the host computing device to increase the threshold.

18. The method of claim 15, further comprising:

generating, by the host computing device, inking data representative of predicted input operations predicted to be performed in the user input area based at least on inking data representative of previously detected input operations in the user input area; and updating, by the host computing device, the inking data representative of previously detected input operations based at least on the provided reports.

19. The method of claim 15, wherein the predictor and the host predictor use a predictive model to generate the inking data representative of predicted input operations, the method further comprising:

selecting the same predictive model for the predictor and the host predictor.

20. The method of claim 19, further comprising:

initializing the predictive model selected for the digitizer and the predictive model selected for the host computing device with the same set of parameters.

* * * * *